United States Patent
Rombaut et al.

(10) Patent No.: US 7,258,890 B2
(45) Date of Patent: Aug. 21, 2007

(54) PROCESS FOR DECAPSULATING CRUSTACEAN OR ROTIFER EGGS

(75) Inventors: Geert Rombaut, Zele (BE); Eddy Naessens-Foucquaert, De Pinte (BE); Dirk Grymonpré, Oostakker (BE); Luciaan Alex Johan Van Nieuwenhove, Nonthaburi (TH)

(73) Assignee: Cooperatieve Centrale Raiffeisen-Boerenleenbank B.A. (NL)

( * ) Notice: Subject to any disclaimer, the term of this patent is extended or adjusted under 35 U.S.C. 154(b) by 605 days.

(21) Appl. No.: 10/436,583

(22) Filed: May 13, 2003

(65) Prior Publication Data

US 2004/0121056 A1    Jun. 24, 2004

(30) Foreign Application Priority Data

Dec. 24, 2002    (EP)    ................................... 02447275

(51) Int. Cl.
*A23L 1/325*    (2006.01)
(52) U.S. Cl. .................. 426/643; 426/480; 426/614
(58) Field of Classification Search ................ 426/643, 426/614, 480
See application file for complete search history.

(56) References Cited

U.S. PATENT DOCUMENTS

| | | | |
|---|---|---|---|
| 3,029,784 A | | 4/1962 | Elbreder et al. |
| 3,673,986 A | | 7/1972 | Braunhut |
| 4,163,064 A | * | 7/1979 | Hill ............................... 426/2 |
| 4,931,551 A | | 6/1990 | Albisetti et al. |
| 5,104,668 A | | 4/1992 | Cole et al. |
| 6,284,297 B1 | | 9/2001 | Sogabe |

FOREIGN PATENT DOCUMENTS

| | | | |
|---|---|---|---|
| EP | 1 195 088 A | | 4/2002 |
| GB | 2290460 | * | 3/1996 |
| JP | 59 113185 A | | 6/1984 |
| JP | 3-210154 | * | 9/1991 |
| RU | 2 150 196 C | | 6/2000 |

OTHER PUBLICATIONS

Derwent Database Abstract. Acc No. 1994-023823. for SU 1784146 published Dec. 30, 1992. Inventors: Gil et al.*
James S. Clegg and Frank P. Conte, *A Review of the Cellular and Developmental Biology of Artemia*, Brine Shrimp Artemia. vol. 2, 1980, pp. 11-54.
G. Van Stappen, P. Lavens and P. Sorgeloos, *Effects of Hydrogen Peroxide Treatment in Artemia Cysts of Different Geographical Origin*, Arch. Hydrobiol. Spec. Issues Advanc. Limnol. 52, p. 281-296, Dec. 1998.
Weninger, G., *Comparative Studies of the Incidence of Small Metazoa During Breakdown Processes*, Sitzungsber., Osterr. Akad. Wiss., Abt. 1, (19710000) vol. 179, No. 7, pp. 129-158. Abstract Only.

* cited by examiner

*Primary Examiner*—Anthony Weier
(74) *Attorney, Agent, or Firm*—DLA Piper US LLP

(57) ABSTRACT

A process is claimed for decapsulating crustacean or rotifer eggs wherein the outer shells of the eggs are removed by dissolving the outer shells of the eggs by means of a liquid medium containing permanganate. The decapsulation process can be either performed under conditions which are lethal for the eggs or under non-lethal conditions which enable to obtain viable decapsulated eggs. The advantage of decapsulating cysts with permanganate instead of with hypochlorite, which is the known decapsulation process, is that this process is practical to implement on a large scale in which it is not hampered by pollution caused by the chemicals incorporated in the process nor the environmental concerns that are raised for the disposal of such chemicals. This advantage can also be achieved by an alternative process which involves the step of dissolving the outer shells of the eggs in a liquid medium having a pH higher than 11 and a temperature higher than 600 C and/or which contains persulfate.

39 Claims, No Drawings

PROCESS FOR DECAPSULATING CRUSTACEAN OR ROTIFER EGGS

RELATED APPLICATION

This application claims benefit of European Patent Application No. 02 447 275.5 filed on Dec. 24, 2002.

FIELD OF THE INVENTION

This invention relates to a process for decapsulating crustacean or rotifer eggs wherein the outer shells of the eggs are removed, in particular in a chemical way. The decapsulating process may either be carried out under conditions which are lethal for the eggs or under non-lethal conditions which enable the production of viable decapsulated eggs.

BACKGROUND

In practice chemical decapsulation processes are used for decapsulating crustacean eggs and especially for decapsulating *Artemia* cysts. The importance of decapsulating *Artemia* cysts when used as food in aquaculture has already been described by Sorgeloos et al. in the article "Decapsulation of *Artemia* cysts: a simple technique for the improvement of the use of brine shrimp in aquaculture" in Aquaculture, 12 (1977) 311-315 and recently revised by Dhont and Sorgeloos in "Applications of *Artemia* " in: *Artemia*, basic and applied biology, edited by Abatzopoulos et al. (2002) 251-277. The main advantages to use decapsulated cysts of the brine shrimp *Artemia* is the achieved disinfection and that no separation of the nauplii from the hatching debris is required. Moreover, decapsulated non-hatching cysts can be used for direct ingestion and digestion by marine fish and crustacean larvae which means a valorisation of an otherwise inferior product. Consequently, the decapsulated cysts do not necessarily have to be viable. However, since the *Artemia* nauplii, which hatch out of the *Artemia* cysts, are commonly used as live food organisms in aquaculture, more particularly as live food for the early larval stages of marine fish and shrimp, the decapsulation process is preferably carried out under conditions which are non-lethal for the cysts.

In practice, the *Artemia* nauplii as live food are not marketed as such but as *Artemia* cysts. Hatching of cysts is done by incubating them in a hatching medium for an incubation period that is typically shorter than 24 hours so that everyday a new supply of free swimming nauplii can be produced using the same hatching infrastructure.

To harvest the daily needed portion of free-swimming nauplii, they first need to be separated from empty shells and unhatched cysts. Several separating techniques exist whereby the empty shells are floating at the surface meanwhile the swimming nauplii are siphoned at the bottom from the tank. However, some batches of *Artemia* can hardly be separated. The unhatched cysts and empty shells often cause deleterious effects when they are ingested by the predator. They are not digested and may cause obstruction of the gut. Moreover, as cyst shells are loaded with bacteria, infections may occur in fish or crustacean cultures after the addition of a mixture of nauplii and cysts (or shells).

In the known decapsulation processes, the hard dark brown external layer of the cyst, the chorion or tertiary envelope, is removed by short-term exposure of the hydrated cysts to a hypochlorite solution. The chorion can be oxidised because it is comprised of lipoproteins. However, the embryonic cuticle beneath is chitinous and nonreactive in hypochlorite solutions so that the viability of the enclosed embryo is unaffected when the decapsulation process is carried out correctly.

The known decapsulation processes of brine shrimp cysts typically involve four steps (see the above mentioned article of Sorgeloos et al., U.S. Pat. No. 4,163,064 and Van Stappen, "Use of cysts" in Manual on the production and use of live food for aquaculture, edited by Lavens and Sorgeloos (1996) 107-136"); (i) hydration of cysts in seawater or freshwater; (ii) oxidation in a strong hypochlorite solution and NAOH; (iii) stopping the oxidation reaction at a predetermined time by dilution with water and (iv) thorough rinsing to remove debris and traces of chemicals after which the denuded cysts either can be transferred to a saturated saline solution to be packed in a brine for future use or they can be fed to cultured animals directly.

Advantages of a chemical decapsulating process are the decreased labour costs by eliminating time consuming processes of separating newly-hatched brine shrimp from unhatched and empty shells, the fact that denuded cysts are 100% edible even in their unhatched state and that it provides a product which tend to hatch better with a higher nutritional value. Moreover, through the elimination of the outer shell, a source of bacterial contamination is removed.

A drawback of the known decapsulation process is, however, that it is impractical to implement on a large scale due to the pollution caused by the chemicals incorporated in the process and the environmental concerns that are raised for the disposal of such chemicals. Due to the use of hypochlorite, the wastewater contains high levels of toxic products, which are difficult to purify. Tests we performed have shown that the process water contains high levels of AOX (Absorbable Organic Halogen compounds) and TOX (Total Organic Halogen compounds), which nowadays restrict the process to be carried out on a big scale due to environmental concerns for the disposal of such chemicals.

It would therefore be advantageous to provide a new chemical decapsulation process wherein the use of a hypochlorite solution can be avoided.

SUMMARY OF THE INVENTION

This invention relates to a process for decapsulating crustacean or rotifer eggs, wherein the outer shells of the eggs are removed including oxidizing the outer shells of the eggs in an oxidizing liquid medium containing permanganate to transform the outer shells of the eggs into a manganese containing outer layer, and dissolving the manganese containing outer layer after the outer shells of the eggs have been oxidized.

This invention also relates to a process for decapsulating crustacean or rotifer eggs, wherein the outer shells of the eggs are removed including dissolving the outer shells of the eggs in a liquid medium having a pH higher than 11, a temperature higher than 60° C., and/or which contains persulfate by immersing the eggs in the liquid medium for a time sufficient to cause the outer shells of the eggs to dissolve therein.

DETAILED DESCRIPTION

The process according to one aspect of the invention is characterized in that it comprises the step of oxidizing the outer shells of the eggs in an oxidizing liquid medium containing permanganate so that the outer shells of the eggs are transformed into a manganese containing outer layer and the further step of dissolving the manganese containing outer layer after the outer shells of the eggs have been oxidized. In another aspect, the invention comprises the step of dissolving the outer shells of the eggs in a liquid medium, which has a pH higher than 11, preferably higher than 12, and a temperature higher than 60° C., preferably higher than 70° C. and more preferably higher than 80° C., and/or which contains persulfate by immersing the eggs in this liquid medium for a time sufficient to cause the outer shells of the eggs to dissolve therein.

We tested different oxidiizing compounds, but none of them appeared to offer a practical alternative to sodium or calcium hypochlorite when the eggs should remain viable after the decapsulation process. Also permanganate, in particular potassium permanganate, did not offer the same effects as sodium hypochlorite. In contrast to hypochlorite, the outer shell was not removed by oxidizing, but became a black layer by the oxidation reaction with permanganate. Quite surprisingly, we found that, the black outer layer formed by the reaction with permanganate onto the eggs could be dissolved by other chemicals, in particular by chemicals which do not produce AOX or TOX compounds.

In addition to the fact that permanganate does not cause AOX or TOX compounds in the process water, it appeared that it offered further important advantages over the use of hypochlorite.

First of all, it appeared that it is not necessary to hydrate the eggs by soaking them into water before introducing them into the oxidising permanganate solution. A complete hydration of the eggs before the classical decapsulation procedure is normally needed to allow a complete removal of the cyst shells, which complicates the procedure.

A further advantage is that the oxidising treatment with permanganate is less harmful to the eggs when the oxidation is not stopped in time. With hypochlorite, once the outer shell is oxidised, the excess hypochlorite has to be removed quickly in order to avoid negative effects on the viability of the eggs. When decapsulation is done with hypochlorite on a large scale, in large tanks, it is thus not practical to remove the hypochlorite by sieving of and rinsing the eggs. With permanganate, the oxidation process is finished for example after 12 to 17 minutes, depending on the reaction conditions, but the eggs may be left in the medium for 30 or 40 minutes without damage to the embryos.

When testing different oxidizing compounds, we found that by increasing the pH to a value higher than 11, preferably higher than 12, (this can be achieved by for example the introduction of a strong base like NaOH), and by using a sufficiently high temperature, it was also possible to decapsulate *Artemia* cysts without using chlorine containing oxidizing compounds. Due to the relatively high temperatures, the decapsulated cyst were however not viable any more.

We also found that the outer shells of the eggs can also be dissolved by oxidation with persulfate. This oxidizing reaction is preferably performed under alkaline conditions and at a higher temperature, in particular at a temperature higher than 40° C., to increase the speed thereof. When using a sufficient amount of persulfate, achieving such a high temperature requires no additional heating due to the exothermicity of the oxidizing reaction. A very quick decapsulation could be achieved by means of persulfate when performing the oxidizing reaction at a pH higher than 11 and when allowing the temperature of the oxidising liquid medium to rise to a temperature higher than 60° C.

In a preferred embodiment of the process according to the invention, the outer shells of the eggs are oxidised by means of permanganate and, per kg dry egg matter, use is made of at least 50 g, preferably at least 100 g, more preferably at least 150 g, and most preferably at least 200 g of $MnO^-_4$ for oxidising the outer shells in the oxidising liquid medium. Preferably, use is made per kg dry egg matter of less than 1000 g, preferably less than 500 g, more preferably less than 400 g, and most preferably less than 300 g of $MnO^-_4$.

Increasing the amount of permanganate within these ranges, speeds up the reaction, however, more heat during the reaction is produced which can harm the viability of the cysts (embryos will die at temperatures higher than 40° C.) when this heat is not effectively withdrawn. Decreasing the amount of permanganate slows down the reaction until the point is reached where the amount of permanganate is insufficient to decapsulate the cysts in the subsequent step of the process. When higher amounts of permanganate are needed, they can be added gradually, or in two or more steps, so that the temperature of the oxidising liquid medium can be controlled better.

In a further preferred embodiment, the process according to the invention is characterised in that after the oxidising step with permanganate, the eggs are removed out of the oxidising liquid medium, in particular by sieving them out, and the eggs are introduced in a further liquid medium wherein the formed manganese containing outer layer is dissolved.

Removing of the eggs out of the first liquid medium requires the use of less chemicals for dissolving the manganese containing outer layer, more particularly for converting the produced manganese dioxide and/or manganese hydroxide into the water soluble form.

In a preferred embodiment of the invention, the manganese containing outer layer of the eggs is dissolved in said further liquid medium by reaction with ascorbic acid, erythorbic acid and/or with a salt of either one of these acids.

An advantage of this preferred embodiment is that contact of the treated embryos with more aggressive chemical agents can be avoided.

Other particularities and advantages of the invention will become apparent from the following description of some particular embodiments of the process according to the present invention.

In the process according to the invention crustacean or rotifer eggs are decapsulated. Such eggs have outer shells which can be removed by dissolving them chemically in a liquid medium. As explained already hereabove, decapsulation is especially important for cysts (=eggs) of the brine shrimp *Artemia*. Other valuable organisms, frequently used for aquaculture purposes are rotifers. Rotifers can also be offered as dormant cysts, which can be used as an inoculum for new cultures of rotifers (Production, disinfection and evaluation for aquaculture applications of rotifer resting eggs from Bohai Bay, P. R. of China by: Dhert et al. In: Aquaculture International, 1997. Vol: 5, 105-112).

Since the decapsulation of *Artemia* cysts is of the greatest importance from an economical point of view, the further description of the process according to the present invention will be given with reference to the decapsulation of *Artemia* eggs.

In the classical decapsulation procedures, the hard shell that surrounds the dormant *Artemia* embryo, is removed by the exposure of the shell to a hypochlorite solution. The first step in the classical decapsulation procedure involves the hydration of the cysts. Complete removal of the envelope can only be performed when the cysts are spherical. In the method of decapsulation according to the present invention, it is not required to obtain spherical (hydrated) cysts to successfully decapsulate. It is thus not necessary to include a water-soaking step before the eggs are exposed to the oxidising agent. Dehydrated (brined or processed) eggs with a water content lower than 30% and preferably lower than 20% can be introduced directly into the decapsulating solution.

Decapsulation of *Artemia* eggs can first of all be achieved by using a combination of sufficiently high pH and temperature. Without the presence of oxidising agents, the liquid medium should have a pH higher than 11, preferably higher than 12, and the temperature of this medium should be raised to a temperature higher than 60° C., preferably higher than 70° C., and more preferably higher than 80° C. Under these circumstances, the shells of the eggs can be dissolved without the use of oxidising agents. For achieving the high pH values, use can be made of strongly alkaline compounds, in particular of hydroxides such as sodium or potassium hydroxide. The required temperature can be achieved by heating. Another way of increasing the temperature of the liquid medium is to make use of an exothermic chemical reaction. It has been found for example that an effective decapsulation can be achieved by using sodium hydroxide to raise the pH in combination with a persulfate, for example sodium persulfate ($Na_2S_2O_8$), which reacts with the organic matter of the outer shell of the cysts. This last reaction is an exothermic reaction in which the temperatures raised easily above 90° C. and the decapsulation was terminated within a few minutes. Under such conditions, it appears that the outer shell of the eggs dissolves quite quickly.

Sodium persulfate or another persulfate compound can also be used at lower temperatures, by using lower persulfate concentrations and/or by an effective cooling. At lower temperatures, the decapsulation reaction takes however a considerably longer time. The process with persulfate should therefore preferably be carried out at a temperature higher than 40° C., which is however lethal for *Artemia* embryos. An important advantage of the process involving a combination of a high pH and a high temperature and/or the use of persulfate is that it allows to decapsulate the eggs without having to add any hypochlorite containing or producing oxidising compounds. However, the process according to the invention can also be used to reduce the amount of hypochlorite containing or producing oxidising compounds needed to decapsulate cysts so that in particular an amount of hypochlorite containing or producing oxidising compounds containing or producing less than 0.2 g hypochlorite per g dry egg matter is sufficient to decapsulate the cysts. Preferably, the process according to the invention is performed so that it allows to decapsulate the eggs without having to add an amount of such hypochlorite containing or producing oxidising compounds which may cause environmental problems (for example amounts of hypochlorite containing or producing oxidising compounds which contain or produce less than 0.02 g hypochlorite per g dry egg matter).

In a preferred embodiment of the process according to the present invention, the decapsulation process is performed with the use of permanganate. In this way, the outer shells of the cysts can be removed within a relatively short period of time without raising the temperature to more than 40° C. This method therefore allows to obtain viable decapsulated cysts and offer further the same advantage that the use of hypochlorite containing or producing oxidising compounds can be avoided or limited to an amount below 0.2 g hypochlorite per g dry egg matter, preferably to an amount below 0.02 g hypochlorite per g dry egg matter.

The decapsulation process with permanganate comprises two steps. In the first step the outer shells of the eggs are oxidised in an oxidising liquid medium which contains the permanganate so that the outer shells are transformed in manganese containing outer layers. In a next step, these manganese containing layers are then dissolved.

During the oxidising step the colour of the oxidising medium changes from purple to brown—black. This may be explained by the reaction of the purple permanganate ($MnO^-_4$) into black manganese dioxide and/or hydroxide, which is at least partially deposited on the eggs. In the next step, this brown—black layer on the decapsulated embryos need to be removed before the embryos can be used for aquaculture purposes. This removal can be achieved by the conversion of manganese dioxide and/or hydroxide to the water soluble manganese (II) form.

The permanganate used in the oxidising step is a known oxidising component which works in low pH environments. However, for oxidising some components, permanganate is preferably used in high pH environments. The decapsulation process, in which permanganate is used, is an example of an oxidation reaction that works better when the pH is at least 8. The oxidising step is preferably carried out at a pH higher than 9 and most preferably at a pH higher that 10. Such high pH values can for example be reached by the addition of NaOH or KOH to the medium. In examples 1 to 4, in which decapsulation was performed with permanganate, a pH value of about 12.6 was reached by adding 240 mmoles NaOH to 1L of $KMnO_4$ solution.

Depending on the type of eggs, a predetermined amount of permanganate is needed to oxidise the outer shells. This amount is usually higher than 50 g of $MnO^-_4$ per kg dry egg matter, use being preferably made of at least 100 g, more preferably at least 150 g, and most preferably at least 200 g of $MnO^-_4$ per kg dry egg matter. In practice, the amount of permanganate needed to oxidise the outer shells will usually be lower than 1000 g $MnO^-_4$ per kg dry egg matter. The used amounts are preferably lower than 500 g, more preferably lower than 400 g, and most preferably lower than 300 g of $MnO^-_4$ per kg dry egg matter.

The next step, namely the step in which manganese dioxide and/or manganese hydroxide is converted into water soluble compounds can be done in the same medium, more particularly by converting the oxidising liquid medium in a further medium (by adding chemical agents) wherein the manganese containing outer layers of the eggs can be dissolved. However, the cysts or eggs are preferably sieved out of the oxidising medium and introduced in a further medium wherein the manganese containing outer layers of the eggs are dissolved. In this way less chemicals are needed because only the manganese dioxide and/or manganese hydroxide deposited on the cysts need to be converted, any manganese dioxide and/or manganese hydroxide in the medium being removed. Moreover, any alkaline compounds in the oxidising medium and any excess of permanganate which could react with the components of the further medium wherein the outer layers are dissolved are also removed.

The oxidised manganese containing outer layers of the eggs can be dissolved with a strong acid like HCl, but this can not be done without damaging the de-shelled embryos. After a treatment like this, the embryos will not be viable anymore.

To dissolve the outer layers by means of less aggressive chemical compounds, use can also be made of hydrogen peroxide. When the pH of the further liquid medium is lowered to a pH lower than 5, preferably lower than 4 and more preferably lower than 3, the manganese containing outer layers can be dissolved by means of hydrogen peroxide. The further liquid medium can also be acidified by for instance diluted hypochloric acid, acetic acid, formic acid or other acids to a pH lower than 5, preferably lower than 4 and most preferably lower than 3 in the presence of a peroxide (such as hydrogen peroxide: $H_2O_2$). The introduction of peroxides in the medium causes oxygen gas and foaming problems which should be avoided. Instead of adding the acids in combination with a peroxide, it is also possible to add peracids, preferably perorganic acids. To avoid foaming problems, the peracids should be dosed in a controlled way.

Another way to achieve the conversion to soluble components is by the use of an electrolytic cell in an acidified medium. With an electrolytic cell (for example a simple battery of 6V), a potential is created in the liquid which allows manganese dioxide and/or manganese hydroxide to capture electrons which results in the conversion to the soluble manganese (II) compounds. Still, acidifying the medium requires the addition of rather aggressive molecules to the cysts and forming of gasses and foam can not be completely avoided.

The most preferred way to convert manganese dioxide and/or manganese hydroxide to manganese (II) compounds, is therefore the introduction of ascorbic and/or erythorbic acid and/or salts thereof to the medium. These not aggressive compounds allow to achieve the local potential and pH in which manganese dioxide and/or manganese hydroxide can be converted without further acidifying the medium (and thus avoiding the use of more acids), without or with substantially less formation of gasses or foam and moreover, of which addition is quite simple to carry out in the process.

Decapsulated cysts can be directly hatched into nauplii, or dehydrated in saturated brine and stored for later hatching or for direct feeding. They can be stored in the refrigerator without decrease in hatching. Moreover, they can be packed and distributed as a directly available source of decapsulated *Artemia*.

Thus, one way of decapsulating crustacean or rotifer eggs wherein the outer shells of the eggs are removed includes the step of oxidizing the outer shells of the eggs in an oxidizing liquid medium containing permanganate so that the outer shells of the eggs are transformed into a manganese containing outer layer and the further step of dissolving the manganese containing outer layer after the outer shells of the eggs have been oxidized. The oxidizing step may be carried out under alkaline conditions, in particular, at a pH higher than 8, preferably at a pH higher than 9 and more preferably at a pH higher than 10.

The process of this invention can be illustrated by the following typical examples:

EXAMPLE 1 a) Dissolve 60 g of $KMnO_4$ in 1 liter of cold tap water (10° C.) and mix the potassium permanganate solution thoroughly by aeration.

b) Add 240 mmoles NaOH (e.g. 30 ml of 8M (320 g NaOH/L) NaOH solution) to the permanganate solution and mix thoroughly.

c) Add 200 g of dehydrated brine shrimp eggs (having a water content of 6-8%) to the alkaline permanganate solution and let occur the reaction.

d) At the end of 15 minutes, pour the mixture through a sieve (150 m mesh size), and rinse the contents of the sieve thoroughly with fresh water.

e) Transfer the rinsed content of the sieve to 1 L of a vitamin C solution (40 g vitamin C/L).

f) At the end of the decapsulation process, pour the mixture through a sieve (150 μm), and rinse the contents of the sieve thoroughly with fresh water.

g) The outer shell layer of the cysts has been removed and within 24 hour incubation of the embryos in optimal hatching conditions, the embryos will hatch.

h) Soak the decapsulated cysts in approximately 1 L of saturated brine until they have lost their fresh water content to the brine solution.

Microscopic examination showed that the cysts were fully decapsulated. The hatching percentage (H%: the number of free swimming nauplii that emerge from 100 full cysts) was further not affected by the decapsulation method of this invention

EXAMPLE 2 a) Dissolve 60 g of $KMnO_4$ in 1 liter of cold tap water (10° C.) and mix the potassium permanganate solution thoroughly by aeration.

b) Add 240 mmoles NaOH (e.g. 30 ml of 8M (320 g NaOH/L) NaOH solution) to the permanganate solution and mix thoroughly.

c) Add 200 g of dehydrated brine shrimp eggs to the alkaline permanganate solution and let occur the reaction.

d) At the end of 15 minutes, stop the reaction by means of a reductant (2 g $Na_2S_2O_3.5H_2O$).

e) Add vitamin C (40 g vitamin C) and let occur the reaction.

f) At the end of the decapsulation process, pour the mixture through a sieve (150 μm), and rinse the contents of the sieve thoroughly with fresh water.

g) The outer shell of the cysts has been removed and after 24 hours incubation in optimal conditions, the embryos will hatch.

h) Soak the decapsulated cysts in approximately 1 L of saturated brine until they have lost their fresh water content to the brine solution.

EXAMPLE 3 a) Dissolve 60 g of $KMnO_4$ in 1 liter of cold tap water (10° C.) and mix the potassium permanganate solution thoroughly by aeration.

b) Add 240 mmoles NaOH (e.g. 30 ml of 8M (320 g NaOH/L) NaOH solution) to the permanganate solution and mix thoroughly.

c) Add 200 g of dehydrated brine shrimp eggs to the alkaline permanganate solution and let occur the reaction.

d) At the end of 15 minutes, pour the mixture through a sieve (150 μm mesh size), and rinse the contents of the sieve.

e) Transfer the content of the sieve to an acidified solution of 500 ml 1 M HCl solution with 5 ml of 30% $H_2O_2$ or transfer it to 500 ml 1M per acid (peracetic acid) solution.

f) At the end of the decapsulation process, pour the mixture through a sieve (150 μm), and rinse the contents of the sieve thoroughly with fresh water.

g) The outer shell of the cysts has been removed and after 24 hours incubation in optimal conditions, the embryos will hatch.

h) Soak the decapsulated cysts in approximately 1 L of saturated brine until they have lost their fresh water content to the brine solution.

EXAMPLE 4 a) Dissolve 60 g of $KMnO_4$ in 1 liter of cold tap water (10° C.) and mix the potassium permanganate solution thoroughly by aeration.

b) Add 240 mmoles NaOH (e.g. 30 ml of 8M (320 g NaOH/L) NaOH solution) to the permanganate solution and mix thoroughly.

c) Add 200 g of dehydrated brine shrimp eggs to the alkaline permanganate solution and let occur the reaction.

d) At the end of 15 minutes, pour the mixture through a sieve (150 μm mesh size), and rinse the contents of the sieve.

e) Transfer the content of the sieve to a acidified solution (500 ml 1M HCl solution) and use an electrolytic cell to convert the electric energy (6V battery) to chemical energy (conversion of Mn-dioxides).

f) At the end of the decapsulation process, pour the mixture through a sieve (150 μm), and rinse the contents of the sieve thoroughly with fresh water.

g) Soak the decapsulated cysts in approximately 1 L of saturated brine until they have lost their fresh water content to the brine solution.

h) The outer shell of the cysts has been removed and after 24 hours incubation in optimal conditions, the embryos will hatch.

The above examples enable the production of viable decapsulated cysts. The following example is an illustration of a decapsulation method in which non-viable cysts are achieved.

EXAMPLE 5 a) Dissolve 960 mmoles NaOH (e.g. 120 ml of 8M (320 g NaOH/L) NaOH solution) in 1 liter of hot tap water (80° C.) and mix thoroughly by aeration.

b) Add 200 g of dehydrated brine shrimp eggs to the alkaline solution and let occur the reaction.

c) At the end of the decapsulation process, pour the mixture through a sieve (150 μm), and rinse the contents of the sieve thoroughly with fresh water.

d) Soak the decapsulated cysts in approximately 1 L of saturated brine until they have lost their fresh water content to the brine solution.

The outer shell of the cysts has been removed.

The invention claimed is:

1. A process for decapsulating crustacean or rotifer eggs, wherein the outer shells of the eggs are removed comprising:
   a step of oxidizing the outer shells of the eggs under alkaline conditions in an oxidizing liquid medium containing permanganate to transform the outer shells of the eggs into a manganese containing outer layer; and
   a subsequent step of dissolving the manganese containing outer layer after the outer shells of the eggs have been oxidized.

2. The process according to claim 1, wherein the outer shells of the eggs are oxidized in said oxidizing liquid medium by means of at least 50 g of $MnO^-_4$, per kg dry egg matter.

3. The process according to claim 1, wherein oxidizing is carried out so that manganese (IV) dioxide and/or hydroxide is produced which is at least partially deposited onto the eggs, and at least the manganese (IV) dioxide and/or hydroxide deposited onto the eggs is converted into soluble manganese (II) compounds.

4. The process according to claim 1, further comprising after oxidizing, removing the eggs from the oxidizing liquid medium, and introducing the eggs into a further liquid medium wherein said manganese containing outer layer of the eggs is dissolved.

5. The process according to claim 4, wherein dissolving the manganese containing outer layer of the eggs is caused by reaction with at least one compound selected from the group consisting of ascorbic acid, erythorbic acid, and salts thereof.

6. The process according to claim 1, wherein after oxidizing, the oxidizing liquid medium is converted into a further liquid medium wherein the manganese containing outer layer of the eggs is dissolved.

7. The process according to claim 6, wherein dissolving the manganese containing outer layer of the eggs is caused by reaction with at least one compound selected from the group consisting of ascorbic acid, erythorbic acid, and salts thereof.

8. The process according to claim 4, wherein the manganese containing outer layer of the eggs is dissolved by reaction with hydrogen peroxide.

9. The process according to claim 6, wherein the manganese containing outer layer of the eggs is dissolved by reaction with hydrogen peroxide.

10. The process according to claim 4, wherein the manganese containing outer layer of the eggs is dissolved by reaction with at least one peracid and/or a salt thereof.

11. The process according to claim 6, wherein the manganese containing outer layer of the eggs is dissolved by reaction with at least one peracid and/or a salt thereof.

12. The process according to claim 4, wherein oxidizing is carried out so that manganese (IV) dioxide and/or hydroxide is produced which is at least partially deposited onto the eggs, at least the manganese (IV) dioxide and/or hydroxide deposited onto the eggs is converted into soluble manganese (II) compounds by adjusting the pH and redox potential of the further liquid medium to a pH and redox potential causing such a conversion.

13. The process according to claim 6, wherein oxidizing is carried out so that manganese (IV) dioxide and/or hydroxide is produced which is at least partially deposited onto the eggs, at least the manganese (IV) dioxide and/or hydroxide deposited onto the eggs is converted into soluble manganese (II) compounds by adjusting the pH and redox potential of the further liquid medium to a pH and redox potential causing such a conversion.

14. The process according to claim 12, wherein the redox potential is adjusted by applying an electrical potential difference in the further liquid medium to achieve an electrolytic cell wherein manganese (IV) compounds are converted into manganese (II) compounds.

15. The process according to claim 6, wherein the redox potential is adjusted by applying an electrical potential difference in the further liquid medium to achieve an electrolytic cell wherein manganese (IV) compounds are converted into manganese (II) compounds.

16. The process according to claim 1, wherein the eggs have a water content lower than 30% when added to the oxidizing liquid medium.

17. The process according to claim 1, carried out under non-lethal conditions to produce viable decapsulated eggs.

18. The process according to claim 1, wherein the eggs are *Artemia* cysts.

19. The process according to claim 1, carried out without hypochlorite containing or producing compounds, or with an amount of such compounds which contains or produces less than 0.2 g hypochlorite (ClO⁻) per g dry egg matter.

20. The process according to claim 2, wherein the outer shells of the eggs are oxidized in said oxidizing liquid medium by means of at least 100 g of $MnO^-_4$, per kg dry egg matter.

21. The process according to claim 20, wherein the outer shells of the eggs are oxidized in said oxidizing liquid medium by means of at least 150 g of $MnO^-_4$, per kg dry egg matter.

22. The process according to claim 21, wherein the outer shells of the eggs are oxidized in said oxidizing liquid medium by means of at least 200 g of $MnO^-_4$, per kg dry egg matter.

23. The process according to claim 1, wherein the outer shells of the eggs are oxidized in said oxidizing liquid medium by means of less than 1000 g of $MnO^-_4$, per kg dry egg matter.

24. The process according to claim 23, wherein the outer shells of the eggs are oxidized in said oxidizing liquid medium by means of less than 500 g of $MnO^-_4$, per kg dry egg matter.

25. The process according to claim 24, wherein the outer shells of the eggs are oxidized in said oxidizing liquid medium by means of less than 400 g of $MnO^-_4$, per kg dry egg matter.

26. The process according to claim 25, wherein the outer shells of the eggs are oxidized in said oxidizing liquid medium by means of less than 300 g of $MnO^-_4$, per kg dry egg matter.

27. The process according to claim 1, wherein oxidizing is carried out at a pH higher than 8.

28. The process according to claim 27, wherein oxidizing is carried out at a pH higher than 9.

29. The process according to claim 28, wherein oxidizing is carried out at a pH higher than 10.

30. The process according to claim 8, wherein said reaction with hydrogen peroxide is carried out at a pH lower than 5.

31. The process according to claim 9, wherein said reaction with hydrogen peroxide is carried out at a pH lower than 5.

32. The process according to claim 10, wherein the reaction with the peracid is carried out at a pH lower than 5.

33. The process according to claim 32, wherein the reaction with the peracid is carried out at a pH lower than 4.

34. The process according to claim 33, wherein the reaction with the peracid is carried out at a pH lower than 3.

35. The process according to claim 11, wherein the reaction with the peracid is carried out at a pH lower than 5.

36. The process according to claim 35, wherein the reaction with the peracid is carried out at a pH lower than 4.

37. The process according to claim 36, wherein the reaction with the peracid is carried out at a pH lower than 3.

38. The process according to claim 16, wherein the eggs have a water content lower than 20% when added to the oxidizing liquid medium.

39. The process according to claim 19, carried out without hypochlorite containing or producing compounds, or with an amount of such compounds which contains or produces less than 0.02 g hypochlorite (ClO) per g dry egg matter.

* * * * *